United States Patent
Anderson

(10) Patent No.: US 7,251,927 B2
(45) Date of Patent: *Aug. 7, 2007

(54) JET NOZZLE MIXER

(76) Inventor: Jack H Anderson, 915 Camino Del Mar, Suite 100, Del Mar, CA (US) 92014

( * ) Notice: Subject to any disclaimer, the term of this patent is extended or adjusted under 35 U.S.C. 154(b) by 52 days.

This patent is subject to a terminal disclaimer.

(21) Appl. No.: 11/347,320

(22) Filed: Feb. 6, 2006

(65) Prior Publication Data

US 2006/0242944 A1 Nov. 2, 2006

Related U.S. Application Data

(63) Continuation of application No. 10/783,839, filed on Feb. 20, 2004, now Pat. No. 7,017,331, which is a continuation-in-part of application No. 10/314,101, filed on Dec. 7, 2002, now Pat. No. 6,854,260.

(60) Provisional application No. 60/340,369, filed on Dec. 7, 2001.

(51) Int. Cl.
*F02K 1/08* (2006.01)
*F02K 1/48* (2006.01)

(52) U.S. Cl. .............................. 60/204; 60/262; 60/264; 239/265.43; 181/220

(58) Field of Classification Search .................. 60/204, 60/226.2, 262, 264; 239/265.17, 265.19, 239/265.43; 181/220, 213
See application file for complete search history.

(56) References Cited

U.S. PATENT DOCUMENTS 3,007,304 A * 11/1961 Wotton et al. ......... 239/265.43
3,048,376 A 8/1962 Howald et al.
3,048,975 A 8/1962 Keen
3,174,582 A * 3/1965 Duthion et al. ........ 239/265.17
3,696,617 A 10/1972 Ellis
3,981,603 A 9/1976 Sprunger
4,117,671 A 10/1978 Neal et al.

(Continued)

FOREIGN PATENT DOCUMENTS

EP 0635632 2/1995

(Continued)

*Primary Examiner*—Ted Kim
(74) *Attorney, Agent, or Firm*—Pillsbury Winthrop Shaw Pittman LLP

(57) ABSTRACT

A second stage external jet nozzle mixer (20) includes identically formed lobes which equal in number the lobes of the first stage internal mixer. The external mixer works with the internal mixer, and furthers the mixing of the jet engine internal bypass flow with the internal jet engine core flow. This mixing levels the disparate flow velocities attendant with the jet engine exhaust, reduces the peak velocities from the jet engine core and increases the lower bypass velocities of the jet engine internal bypass flow. The lobes include complex curvatures that greatly enhance mixing of the gases and ambient cooling air, and thereby reduce noise. At the lobe terminus, the lobe dimensional characteristics may be adjusted to thereby adjust the total terminus area to achieve a match to a jet engine to cause that jet engine to run at a determined RPM and noise level. Noise attenuation may also be adjusted by changing lobe dimensions. Prior existing second stage exhaust jet nozzle mixers may be retrofitted to allow alteration of their total terminus area by employing the disclosed device and method.

9 Claims, 17 Drawing Sheets

U.S. PATENT DOCUMENTS

| | | |
|---|---|---|
| 4,335,801 A | 6/1982 | Stachowiak et al. |
| 4,548,034 A | 10/1985 | Maguire |
| 4,666,104 A | 5/1987 | Kelber |
| 4,813,230 A | 3/1989 | Braithwaite |
| 5,127,602 A | 7/1992 | Batey et al. |
| 5,222,359 A | 6/1993 | Klees et al. |
| 5,440,875 A | 8/1995 | Torkelson et al. |
| 5,592,813 A | 1/1997 | Webb |
| 5,666,802 A * | 9/1997 | Lair .......................... 60/226.2 |
| 5,706,651 A | 1/1998 | Lilibridge et al. |
| 5,761,900 A | 6/1998 | Presz, Jr. |
| 5,884,472 A | 3/1999 | Presz, Jr. et al. |
| 6,854,260 B2 | 2/2005 | Anderson |
| 7,017,331 B2 * | 3/2006 | Anderson ................... 60/204 |

FOREIGN PATENT DOCUMENTS

| | | |
|---|---|---|
| GB | 2123486 | 2/1984 |
| GB | 2207468 | 2/1989 |

* cited by examiner

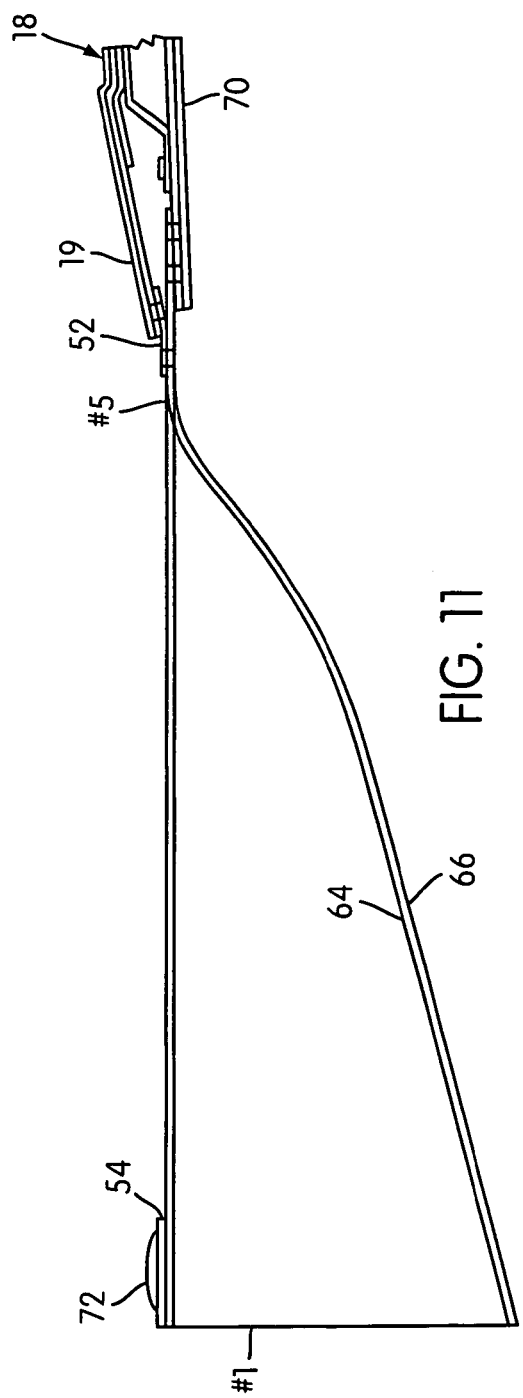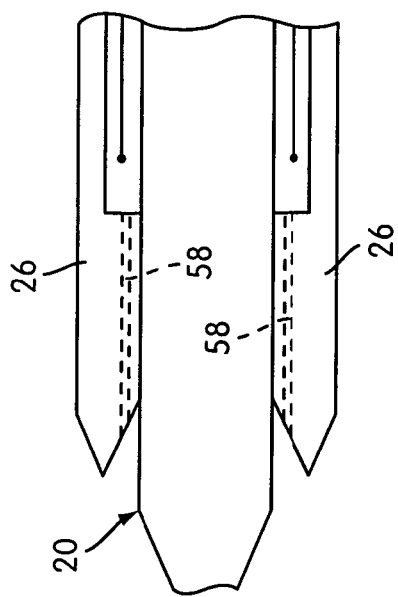

JET NOZZLE MIXER

This application is a Continuation Application of U.S. patent application Ser. No. 10/783,839, filed Feb. 20, 2004, now U.S. Pat. No. 7,017,331, which is a Continuation-in-Part of U.S. application Ser. No. 10/314,101, filed Dec. 7, 2002, now U.S. Pat. No. 6,854,260, issued Feb. 15, 2005, which claims priority to U.S. Provisional Application No. 60/340,369, filed Dec. 7, 2001, now abandoned, the entire contents of each application are incorporated herein by reference, respectively.

FIELD OF THE INVENTION

The present invention relates to jet nozzle mixers for aircraft jet engines and, in particular, to improvements in affecting a greater cooling and a lower noise level in exhaust gases emanating from such engines and in increasing power and fuel efficiency.

DESCRIPTION OF RELATED ART AND OTHER CONSIDERATIONS

Noise (decibel) level in jet aircraft engines is established by laws and regulations, specifically promulgated by the International Civil Aviation Organization (ICAO), Annex 16. At present, commercial jet aircraft weighing over 75,000 pounds (34,000 kilograms) must meet Stage 3/Chapter 3 noise (decibel) level requirements which establish an allowable decibel noise level. Under Annex 16 Stage 4/Chapter 4 requirements, a lower maximum (decibel) level will be mandated, by at least a reduction of 10 decibels from current Stage 3/Chapter 3 levels. Such noise reduction is effected by mixing of the primary hot exhaust gases in an internal mixer with secondary bypass cooling air and by breaking of the single core of exhaust gases into a plurality of smaller cores through use of a first set of lobes positioned internally in the engine. For some engines, a second set of lobes in an external mixer is positioned downstream from the first set at the terminus of the engine. A thrust reverser module is joined to the engine housing at the engine terminus by use of an attendant mechanism covered by the STANG fairing. Because the engine has specifically designed dimensions, the second set of lobes must be configured to accommodate the existing engine design, which has a terminus exit area dimension of 1,100 square inches (7,097 square centimeters), rather than to reconfigure the engine to fit the second set of lobes. Such engine reconfiguration is impractical and expensive. Therefore, the direction towards meeting Stage 3/Chapter 3 noise requirements has been involved in developing a variously configured second set of lobes whose design does not always meet such requirements and, when the lobe design does, the lobes are difficult and expensive to manufacture and the mixer is expensive to be retrofitted to the engine.

Some engines have not employed the use of a second set of lobes or an external mixer, specifically one produced by Pratt & Whitney, in their JT8D-217/219 Series. Currently, this engine includes an internal 12 lobe mixer and is only certified to Stage 3/Chapter 3 noise levels. There has been a desire to qualify this particular engine to Stage 4/Chapter 4 noise levels, but to minimize the costs of doing so with, preferably, no changes in its thrust reversal components primarily because of cost and other economic reasons. To bring this engine to Stage 4/Chapter 4 noise levels, an additional 2 decibel reduction in jet noise is required. Such an upgrading is a challenge that has not been met.

SUMMARY OF THE INVENTION

These and other problems are avoided and the Stage 4/Chapter 4 requirements are both met and surpassed by the present invention, not only for the above-mentioned Pratt & Whitneyy JT8D-217/219 Series engine but also for other engines. The second stage or external jet nozzle mixer of the present invention includes a number of lobes, which are equal in number to those of the first stage or internal mixer, and all of the second stage mixer lobes are identically formed. As the lobes axially extend outwardly from the mixer attachment to the engine nozzle, they axially inwardly expand from an essentially circular base to an undulating configuration whose apices increase in height. The lobes include complex curvatures whose interior and exterior surfaces greatly enhance mixing respectively of the previously mixed bypass cooling air-hot exhaust gases from the internal mixer and additional ambient cooling air, and thereby also reduce noise. At their terminus, the area encompassed by the lobes remains essentially the same (1,065 to 1,120 sq. inches) as for the jet engine for which it is designed which, for the Pratt & Whitney JT8D-217/219 Series engine, is 1,095 to 1,105 square inches (6,089 to 7,097 square centimeters). For other engines, the lobe terminus area is consistent with that of the engine in question.

For the Pratt & Whitney JT8D-217/219 Series engine, for example, the external mixer length is 12 inches±3 inches (30.45 cm±8 cm). The essentially circular base of the lobes at the mixer inlet has a linear dimension of 39.7 inches (101 centimeters) round, providing an area of 1,223 sq. inches (7,891 square centimeters). At the mixer outlet at the full height of the regularly undulating lobes, the dimension of the mixer circumscribing the lobes at their greatest height is also 39.7 inches (101 centimeters) diameter but, because of the scalloped lobe shape, the area enclosed by the lobes is 1,065 to 1,120 sq. inches (6,089 to 6,403 square centimeters), which matches the area of the existing tailpipe.

The exit shape has elliptical shaped lobes and is proportional to a 10×2.5 ellipse (plus or minus 2 inch major axis, and ±0.5 inch minor axis). These curve sides help resist distortion caused by the exhaust gas pressure.

Consistent with the above discussion, an important and preferred design parameter is to shape the external mixer of the present invention with a generally cylindrical configuration and with as short a length as possible, so that it does not interfere with the existing thrust reverser doors at the end of the tailpipe. As a result, the mixer of the present invention permits the use of existing thrust reversers without necessitating any modification thereto. Only a part of the STANG fairings need to be slightly decreased in their inner dimensions to accommodate the internal mixer. Also, the existing tailpipe is shortened by about 5 inches (12.7 centimeters).

Functionally, the interior surfaces of the lobes force the impinging hot gases, as previously mixed with the secondary bypass cooling air by the first set of lobes of the internal mixer, in all directions towards the interior of the mixer, essentially 45° to 60°, to effect a vigorous mixing of the gases. Simultaneously, additional ambient cooling air is forced from the exterior surfaces of the lobes to mix further with the internally mixed gases. These actions cause the smaller gas cores, which were formed by the first stage mixer, to break into innumerable forms which are both cooler and considerably noise attenuated. In part, the internal contours of the lobes act as flutes to produce a lifting effect which causes the primary hot and cold flows to mix before entering the nozzle. The external contours of the lobes act as chutes which produce a venturi effect and accelerate the cooler secondary flow of ambient air. The lobes thereby act collectively as an injector to force the cooler ambient secondary flow into the previously mixed primary flow as it exits the nozzle. These actions further reduce the noise level. Further, the curve sides of the lobes help resist distortion caused by the exhaust gas pressure. An ameliorative further result is that the accelerated gas/air flow helps to faster move large, previously slowed mixtures to increase the efficiency of the jet engine, by increasing its thrust, that is, an increased thrust specific fuel consumption (TSFC) is estimated to be about a 3% improvement. Such increased TSFC occurs through better dynamic mixing of the bypass or fan duct and turbine exhaust gases. It addresses the problem of the transfer from a hot, high velocity volume to a cooler, slower velocity volume. This mixing levels the disparate flow velocities attendant with the jet engine exhaust, reduces the peak velocities from the jet engine core and increases the lower bypass velocities of the jet engine internal bypass flow. Because noise is a function of jet exhaust velocity to the 7th power, and because peak velocities from the core flow are reduced, the jet noise is thereby reduced.

As stated above, the axial length of the mixer of the present invention is 12 inches ±3 inches, which means that there is a lesser distance between the nozzle exit and the buckets of the thrust reverser. The effect of such decreased distance is that more of the thrust from the engine is captured by the buckets and thus utilized to brake the aircraft when needed.

Several advantages are derived from this arrangement. The jet nozzle mixer of the present invention fits within and is attachable to the existing engine exit whose area which, as stated above, is 1,095–1,105 square inches (6,261–7,129 square centimeters) exit area for the Pratt & Whitney JT8D-217/219 Series engine. The lobes of the present invention can be made uniform and easily tailored to provide an efficient mixing of the exhaust gases with the ambient air and the attendant reduction in noise. Its uniform dimensions enables its manufacturing costs to be reduced. The need to modify the existing thrust reverser per se is avoided because the mixer is fittable and attachable to the existing engine exit; only minor dimensional changes in the existing STANG fairing, and tailpipe and outer barrel are required without otherwise needing any change in other components such as the thrust reverser, the thrust reverser doors, and their linkages. Efficiency in jet engine operation is increased, with concomitant saving of fuel and costs thereof. Thrust reverser braking of the aircraft is improved.

Other aims and advantages, as well as a more complete understanding of the present invention, will appear from the following explanation of an exemplary embodiment and the accompanying drawings thereof. With respect to the above description then, it is to be realized that the optimum dimensional relationships for the parts of the invention are to include variations in size, materials, shape, form, function and manner of operation, assembly and use, are deemed readily apparent and obvious to one skilled in the art. As such all equivalent relationships to those illustrated in the drawings and described in the specification are intended to be encompassed by the present invention. It is important, therefore, that the claims be regarded as including such equivalent construction insofar as they do not depart from the spirit and scope of the present invention.

BRIEF DESCRIPTION OF THE DRAWINGS

FIGS. 5-1 through 5-5 illustrate the areas incorporated by the lobes at their respective cross-sections #1–#5. The cross-sections, as portrayed or positioned on the interior surfaces of the lobes, define interior mixer areas within their respective planes, respectively of 1,100 square inches (7,097 square centimeters) at plane #1 (FIG. 5-1), 1,110 square inches (7,162 square centimeters) at plane #2 (FIG. 5-2), 1,120 square inches (7,226 square centimeters) at plane #3 (FIG. 5-3), 1,154 square inches (7,445 square centimeters) at plane #4 (FIG. 5-4), and 1,223 square inches (7,891 square centimeters) at plane #5 (FIG. 5-5) which extends into plane 6 for attachment to the existing Pratt & Whitney JT8D-217/219 Series engine.

FIG. 11 is a view of a specific one of the section curvatures shown in FIG. 9 along with hardware for its attachment to the nozzle or tailpipe.

FIG. 12 is a schematic drawing, not to scale, of an engine nozzle assembly and modified STANG fairings for accommodating the jet nozzle mixer embodied in the present invention.

DETAILED DESCRIPTION

Because the present invention was devised particularly with respect to the Pratt & Whitney JT8D-217/219 Series engine, the following discussion will be directed specifically thereto; however, it is to be understood that the present invention is equally relevant for use in other jet engines and, therefore, is not to be limited to a specific jet engine.

Figure 1A:
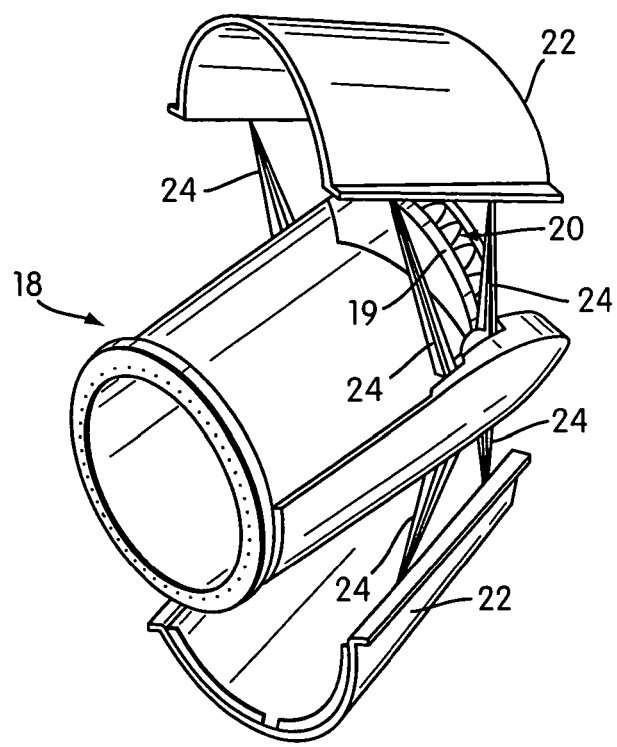
FIGS. 1a and 1b are perspective views of an end portion of a jet engine nozzle assembly to which is attached both a thrust reverser and a second stage external jet nozzle mixer as embodied in the present invention.
Figure 1B:
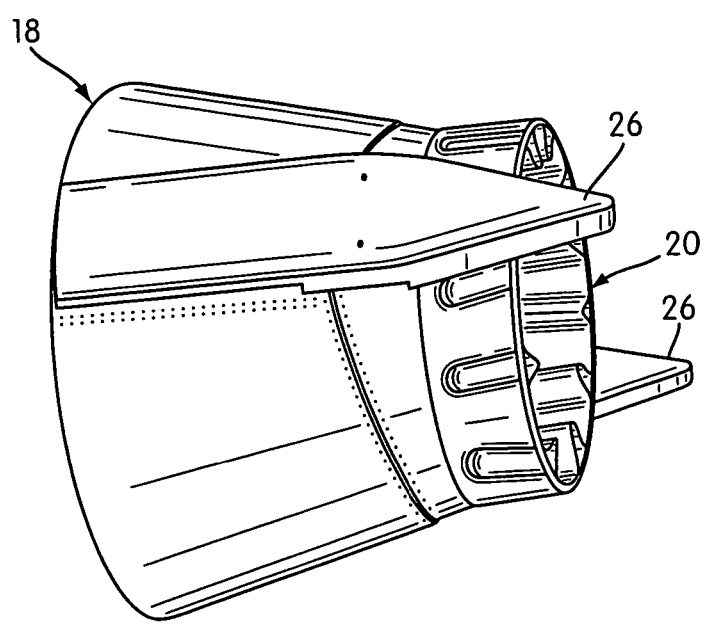

Accordingly, FIGS. 1a and 1b illustrate a nozzle assembly 18 relating to, for example, a Pratt & Whitney JT8D-217/219 Series jet engine to which a jet nozzle mixer 20 as embraced by the present invention is attached at its exhaust terminus 19. Assembly 18 also supports a thrust reverser having a pair of thrust reverser buckets 22. The attachment of the thrust reverser buckets to assembly 20 is effected by bars 24 which are pivotally linked to a pair of diametrically opposed mechanisms housed within fairings 26, one of which is shown in FIG. 1. The fairings are secured at opposite sides of the assembly. The thrust reversers and the linking bars are of conventional design and are unmodified when coupled with the present invention. The fairings are also of conventional design, but a part of the structure covered thereby is slightly modified as will be explained below with respect to FIGS. 12 and 13.

Figure 2:
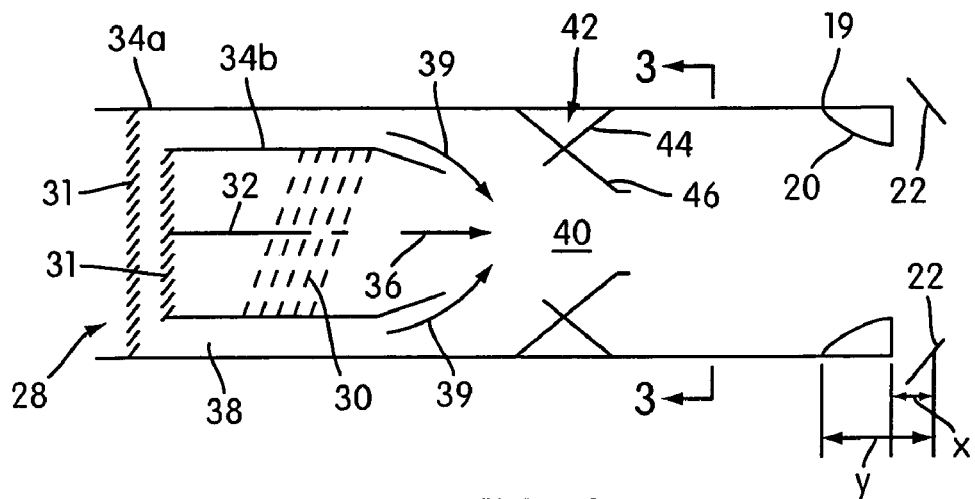
FIG. 2 is schematic drawing illustrating the interior of the jet engine shown in FIG. 1 with a known first stage internal mixer in the interior of the engine and the second stage inventive external jet nozzle mixer at the terminus of the engine, including the decrease in distance between the jet nozzle mixer of the present invention and the thrust reverser buckets, as compared to its non-use.

As shown also in FIG. 2, mixer 20, because of its added axial length, is positioned closer to thrust reverser buckets 22 when they are deployed as brakes. Such closer positioning is demonstrated by the different lengths "x" and "y" of FIG. 2. The ameliorative result of such closer positioning permits the buckets to capture a greater portion of the exhaust for braking purposes than previously obtainable. However, it is important that mixer 20 not be located too close to buckets 22 so that the flow of the redirected exhaust gases are not adversely affected and that the doors, linkages and the mixer are not deleteriously stressed.

Figure 3A:
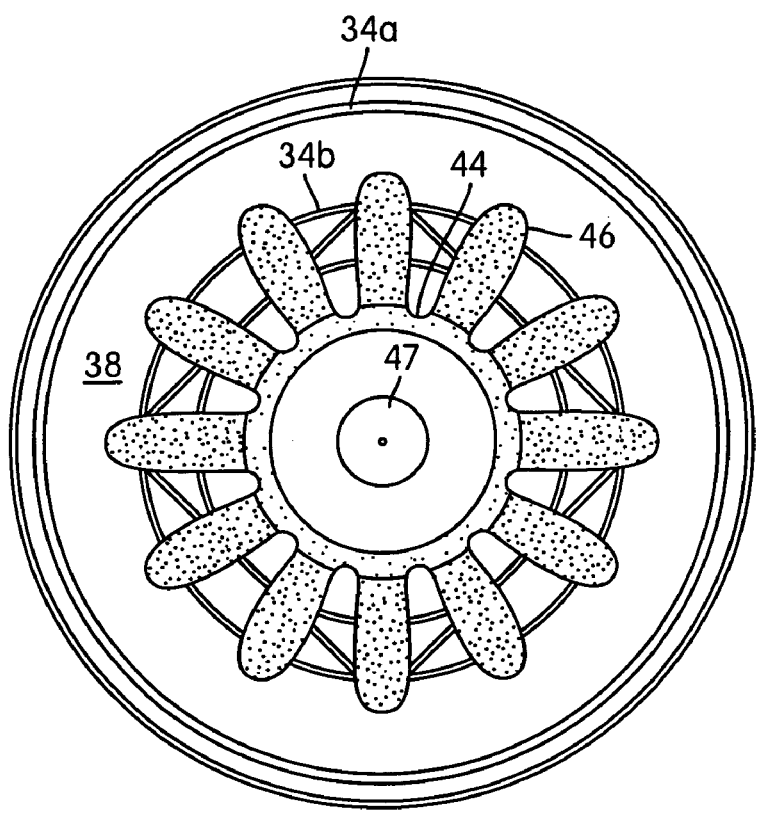
FIG. 3a is a view of the engine and its internal mixer shown in FIG. 2 taken along line 3—3 thereof.
Figure 3B:
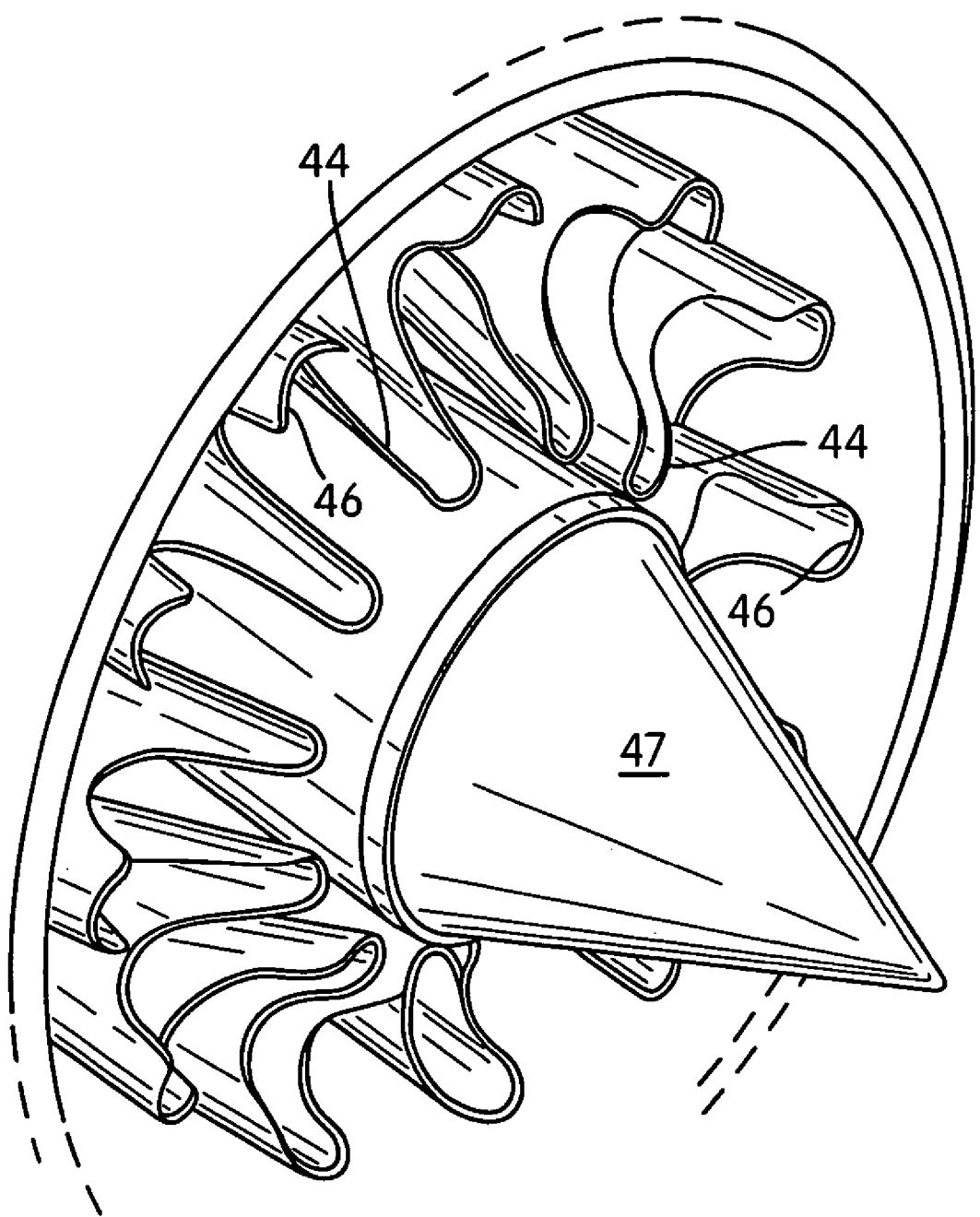
FIG. 3b is a perspective view of the cone and surrounding vanes of the internal mixer.

The internal arrangement of nozzle assembly 18 as secured to a jet engine is depicted in FIGS. 2, 3a and 3b. An engine 28 includes turbine blades 30 and compressor or fan blades 31 joined together on a common shaft 32 within a two-part housing 34a and 34b. For convenience, the burners preceding turbine blades 30 are not shown. Hot exhaust gases exit from the turbine blades as a core 36. A bypass or fan duct 38 surrounds housing 34b for affording passage of cooling air, as denoted by arrow-headed lines 39, from the ambient exterior to first stage or internal jet nozzle mixer 42 of the engine. Core 36 of hot gases is disposed to be mixed with the cooling air within a first stage mixing chamber 40 by use of first stage jet nozzle mixer 42 positioned therein. As best seen in FIGS. 2, 3a and 3b, first stage internal jet nozzle mixer 42 includes two sets of vanes 44 and 46 which are respectively inwardly and outwardly inclined to direct and mix together respectively the cooling air and the hot gases in chamber 40. Vanes 44 and 46 are positioned around a core terminating in a cone 47. As stated above, consistent with the Pratt & Whitney JT8D-217/219 Series jet engine design, the total of inwardly directed cooling air vanes 44 and outwardly directed hot gas vanes 46 respectively number twelve each. This resulting admixture divides core 36 into a smaller cooler central core and twelve surrounding small cores 11 of mixed hot gases and cooling air of different velocities which, nevertheless, are still extremely hot and produce an unacceptably high noise level. These smaller central and surrounding cores pass towards terminus 19 of the nozzle assembly for second stage mixing and cooling by second stage external jet nozzle mixer 20 of the present invention.

Second stage external jet nozzle mixer 20 and its component parts is illustrated in FIGS. 4–11. Mixer 20 includes twelve identical lobes 48 to equal in number the twelve cooling air vanes and the twelve hot gas vanes, and the twelve smaller hot gas cores of the internal mixer. For ease of manufacture, twelve sections, each including a lobe, is fabricated and the sections on either side of the lobes are welded together, such as identified by weld lines 50. Combined, the lobes extend from a circular section through a plurality of increasingly undulating portions, such as exemplified by cross-sections #1–#6. The transition from a round configuration at cross-section #5 to the scalloped or undulated configuration at cross-section #1 is a very smooth complex curve and, consequently, minimizes airflow distortion and drag and maximizes the mixing of the hot gases with neighboring air and thereby to reduce noise. This is achieved by using synchronized cross-sections and a plurality of weighted and blending splines between the cross-sections. Such a design is provided using state-of-the-art CAD software.

Figure 4:
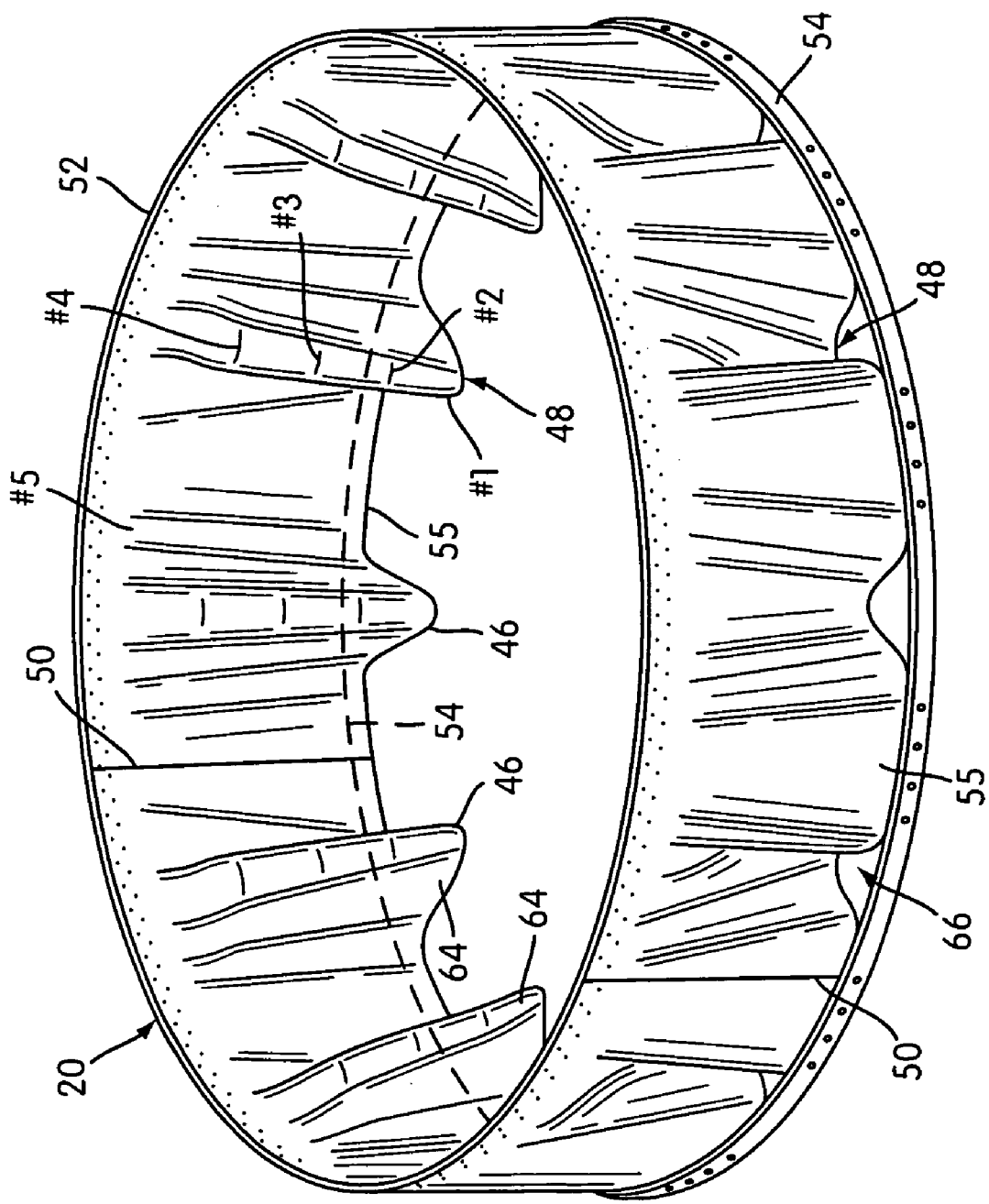
FIG. 4 is a perspective view of the second stage, external mixer assembly of the present invention in which its twelve identically shaped lobes are seen. The four undulating cross-sections, #1 through #4, which variously pass through the lobes of the mixer and which extend from the end of the mixer assembly towards its point of attachment to the terminus of the engine, are representative of all planes which pass through all of the lobes. A fifth cross-section #5, which is circular, extends about the band which anchors the mixer to the engine terminus. A sixth cross-section #6 is positioned behind the plane of the fifth cross-section #5, and is seen in subsequent figures. These six cross-sections are referred to in subsequent figures as defining planes numbered #1–#6.
Figure 5:
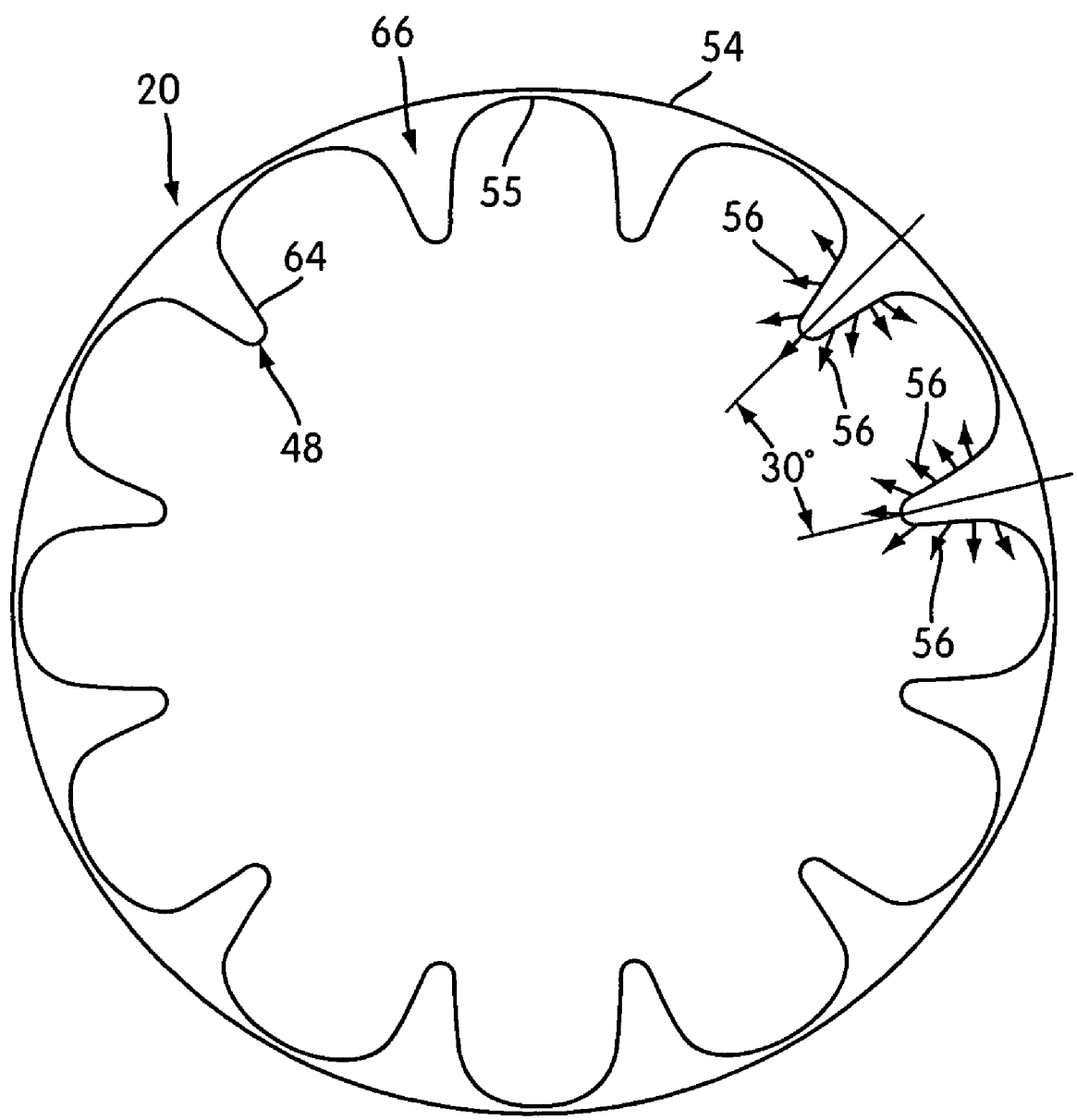
FIG. 5 is a view of the external mixer of the present invention taken perpendicularly to and along the axis of the mixer assembly shown in FIG. 4, and also depicts how the lobes disperse and break up the hot gas/air mixture.
Figures 1, 5:
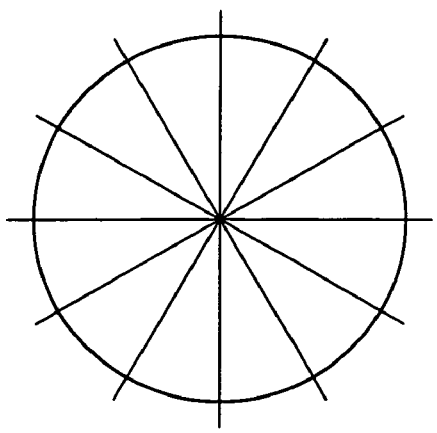
Figures 2, 5:
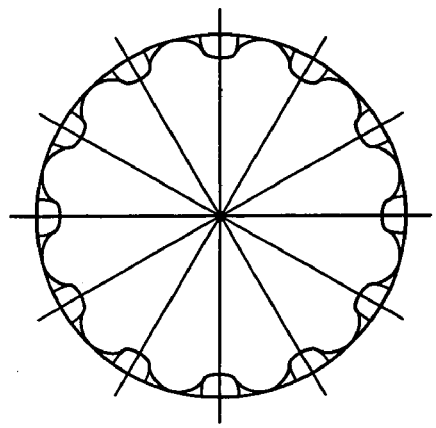
Figures 3, 5:
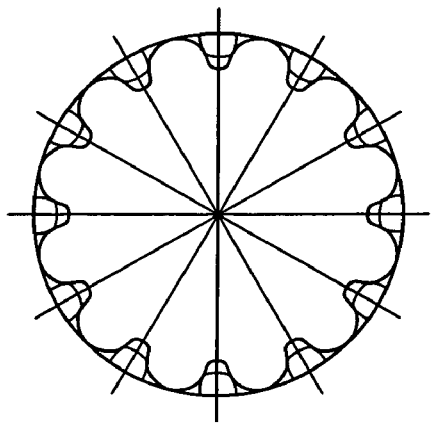
Figures 4, 5:
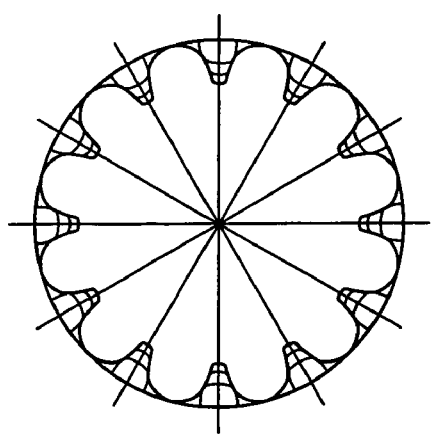
Figure 5:
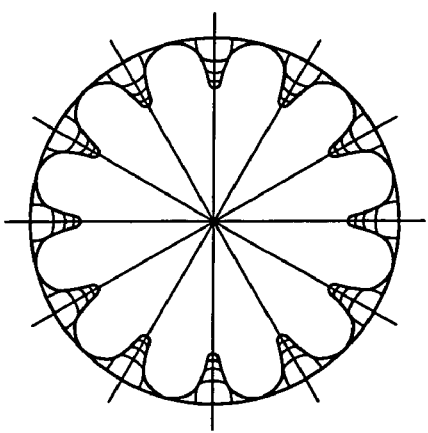
Figure 6:
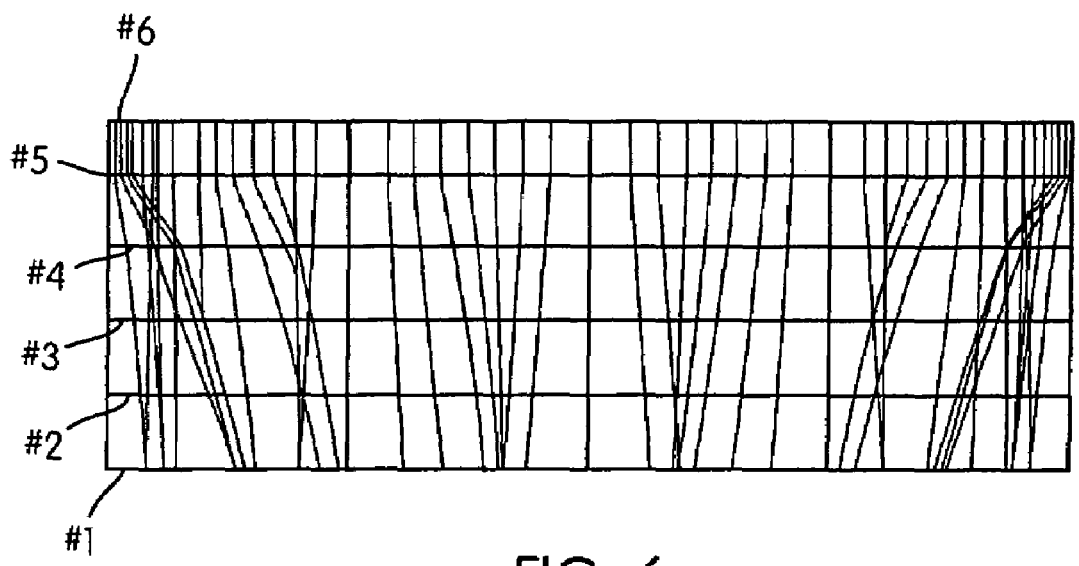
FIG. 6 is a side view, taken 90° with respect to the mixer shown in FIG. 5, of that mixer and its four undulating cross-sections and fifth circular cross-section along planes #1–#5. The circular configuration of the lobes at plane #5 extends generally cylindrically with the same general diameter to its end at plane #6.

As stated above, the cross-sections, as portrayed on the interior surfaces of the lobes and depicted by shading in FIGS. 5-1 through 5-5, delimit interior mixer areas within the planes defined by the cross-sections, respectively of 1,100 square inches (7,097 square centimeters) at plane #1 (FIG. 5-1), 1,110 square inches (7,162 square centimeters) at plane #2 (FIG. 5-2), 1,120 square inches (7,226 square centimeters) at plane #3 (FIG. 5-4), 1,154 square inches (7,445 square centimeters) at plane #4 (FIG. 5-4), and 1,223 square inches (7,891 square centimeters) at plane #5 (FIG. 5-5). The cross-sectional areas from plane #5 to plane #1 decreases arithmetically, about 5%, 2.5%, 1.25%, etc.

The section extending between cross-sections #5 and #6 is an extension from the section adjacent cross-section #5 and is used to affix mixer 20 to the nozzle terminating the Pratt & Whitney JT8D-217/219 Series engine, and has an equivalent 1,223 square inch (7,891 square centimeter) area. An annular reinforcing support band 52 (see particularly FIG. 11) joins the lobes at their circularly shaped section adjacent cross-section #5, while a band ring 54 is joined to lobes 48 at their base sections 55 at their greatest undulation at cross-section #1.

FIG. 11 also illustrates the attachment of mixer 20 to nozzle assembly or tailpipe 18. Specifically, the mixer is secured to terminus 19 of the nozzle assembly and to a doubler ring 70. Both terminus 19 and the doubler ring are angled outwardly and, compared to prior nozzle assemblies, are shorter by approximately 5 inches.

Figure 7:
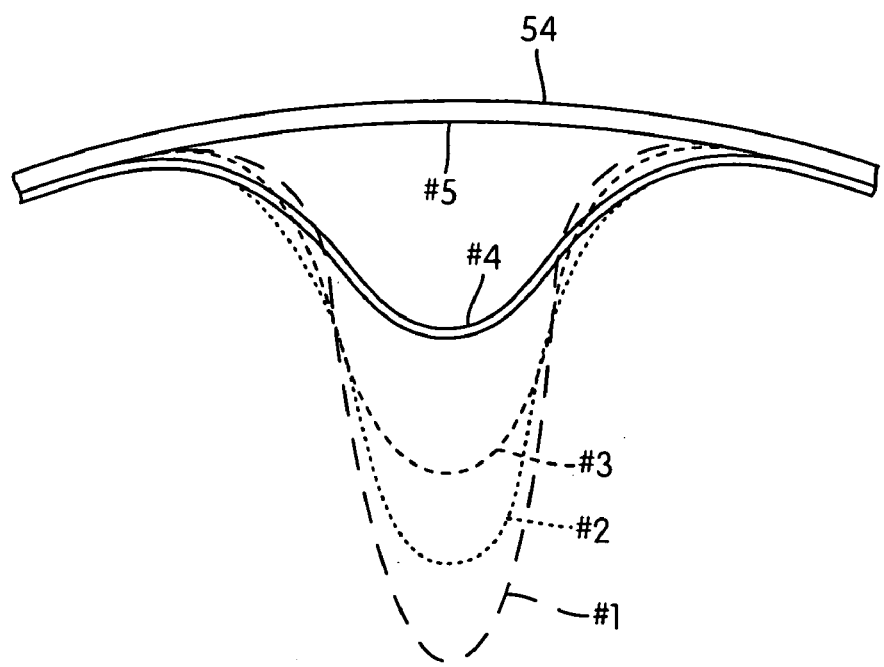
FIG. 7 is an enlarged view of a superimposition of the lobes and the same previously illustrated four undulating cross-sections and fifth circular cross-section as shown in FIGS. 4–6.
Figure 8:
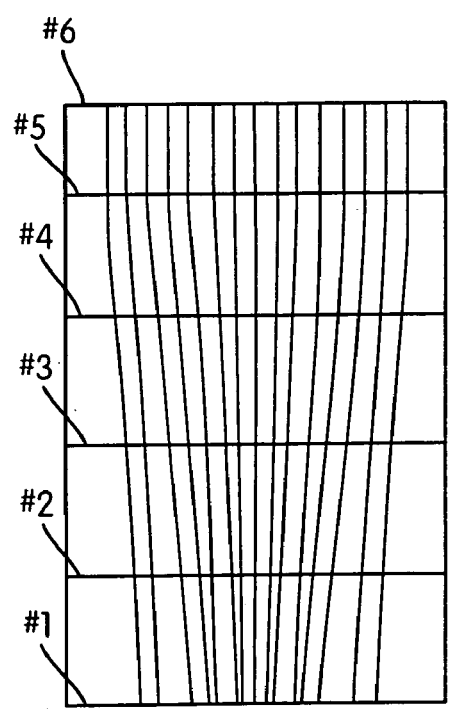
FIG. 8 is a view of the lobe shown in FIG. 7 looking down upon the apex of the lobe, in which the several cross-sections indicate the varying curvature of the lobe as its extends along the mixer axis through cross-sections or planes #1–#6.
Figure 9:
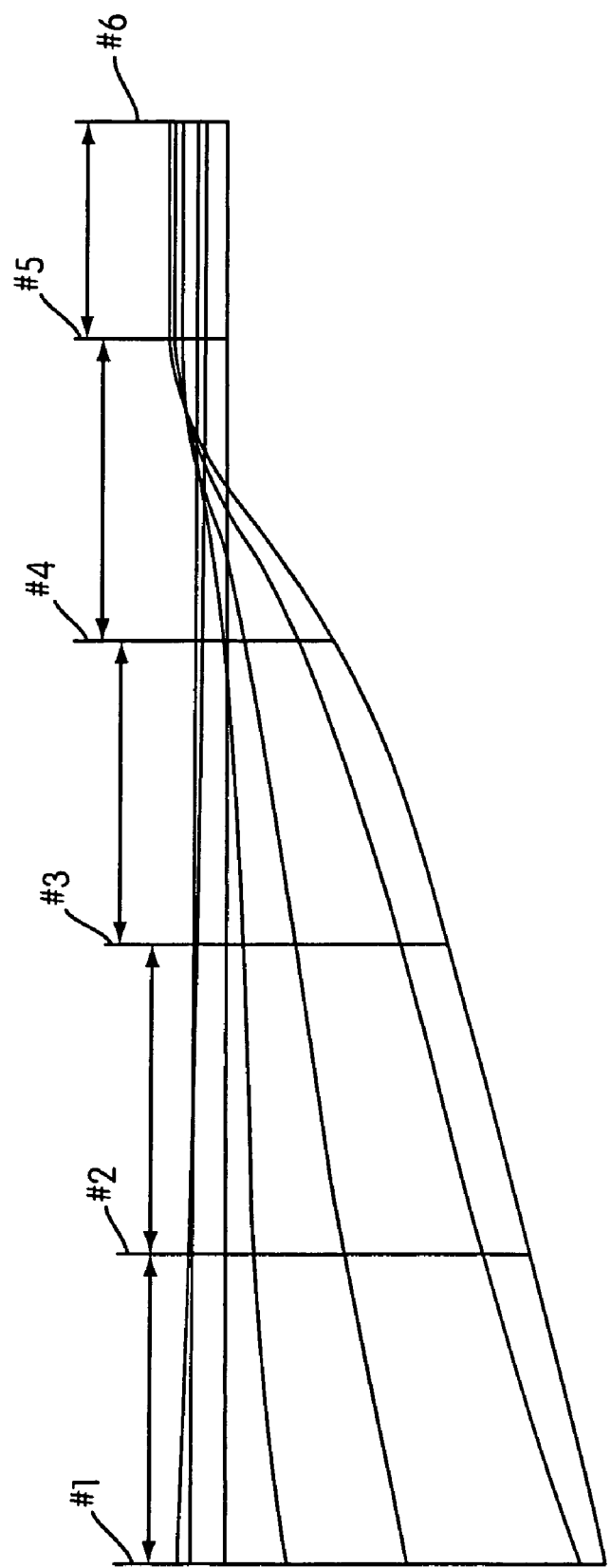
FIG. 9 is a side view of the lobe shown in FIGS. 4–8 and illustrates the several lobe curvatures as it extends along the mixer axis, with specific reference to planes 1–6 with its attaching end to the nozzle or tailpipe.
Figure 10:
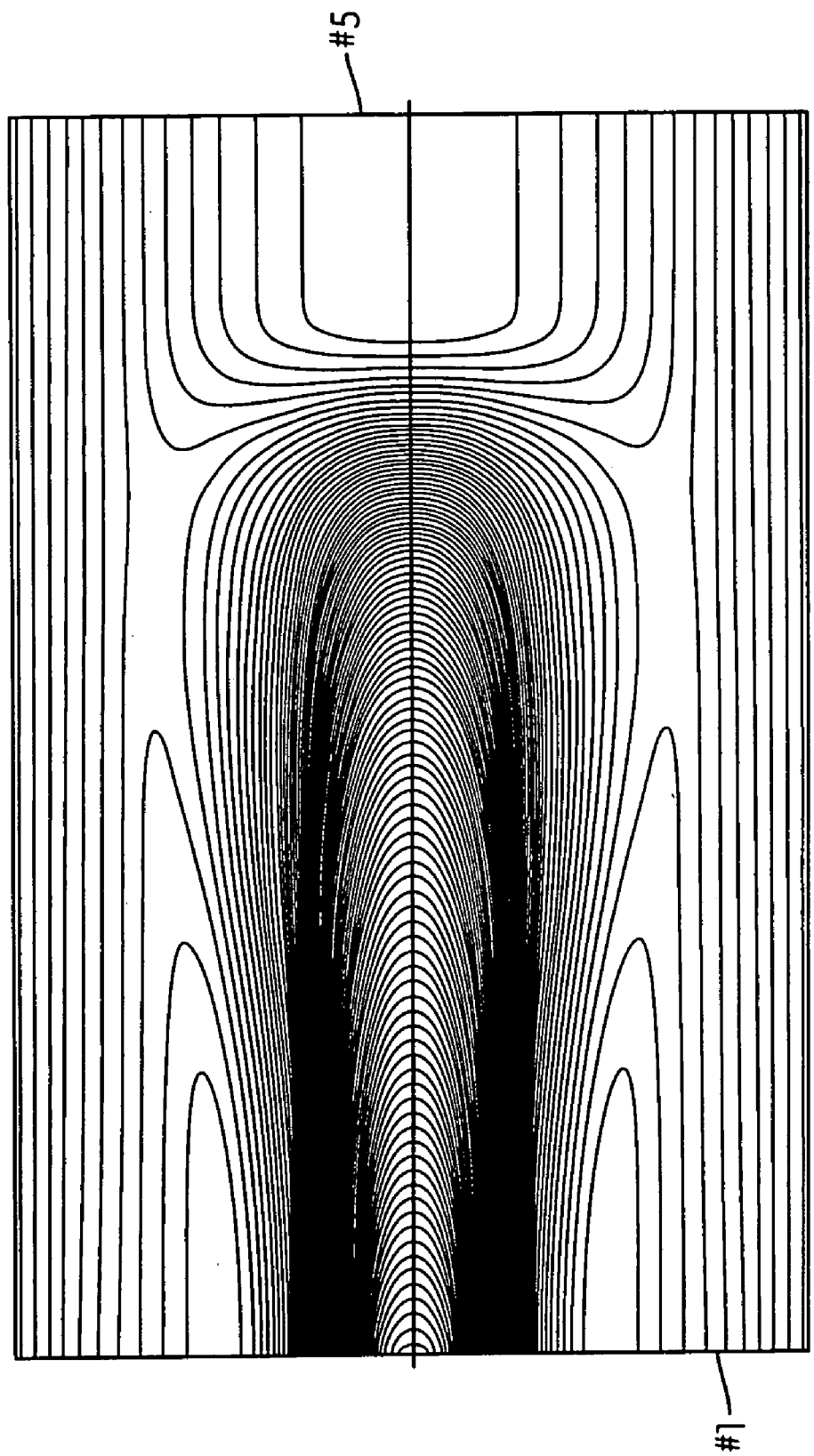
FIG. 10 depicts the contour lines of a lobe between its planes #1–#6, as viewed looking down upon the lobe.

As shown, for example in FIGS. 7 and 11, the interior surfaces of the lobes force the impinging hot gas-bypass cooling air mixture from internal mixer 42 in all directions towards the interior of internal mixer 20, that is, essentially 45° to 60° as illustrated by multiple arrow-headed lines 56 in FIG. 5, to effect a vigorous mixing of the gases. At the same time, additional ambient cooling air is forced from the exterior surfaces of the lobes to mix further with the internally mixed gases. These actions cause the smaller gas cores from internal mixer 42 to break into myriad forms which are both cooler and considerably noise attenuated. In part, the internal contours of the lobes act as flutes or channels 64 to produce a similar aerodynamic action as the skins of the airplane wings to produce a lifting effect. This lifting effect causes the primary hot and cold flows to mix before entering the nozzle. The external contours of the lobes, which act as chutes 66, are designed to act as a multitude of venturis, and thus to accelerate the cooler secondary flow of ambient air. This arrangement effectively forms an injector to force the cooler ambient secondary flow into the previously mixed primary flow as it exits the nozzle. This action further reduces the noise level.

In addition, dimples 72 are formed on both sides of band 54 of the external mixer and act as vortex generators to prevent the mixed gas flow from attaching to band 54 and thereby to enhance the mixing action.

This afore-mentioned acceleration also helps to increase the efficiency of the fuel-air burning in the engine. By producing an increased flow, the exhaust gases are more rapidly exhausted from the engine and thereby the need for the engine and its bypass compressor to expend energy in moving these gases is alleviated.

In addition, the lobes are elliptically shaped, being proportional to a 10×2.5 ellipse, plus or minus 2 inches (5 centimeters) major axis, and plus or minus 0.5 inch (1.3 centimeter) minor axis. These curved sides help resist distortion caused by the exhaust gas pressure.

Figure 13:
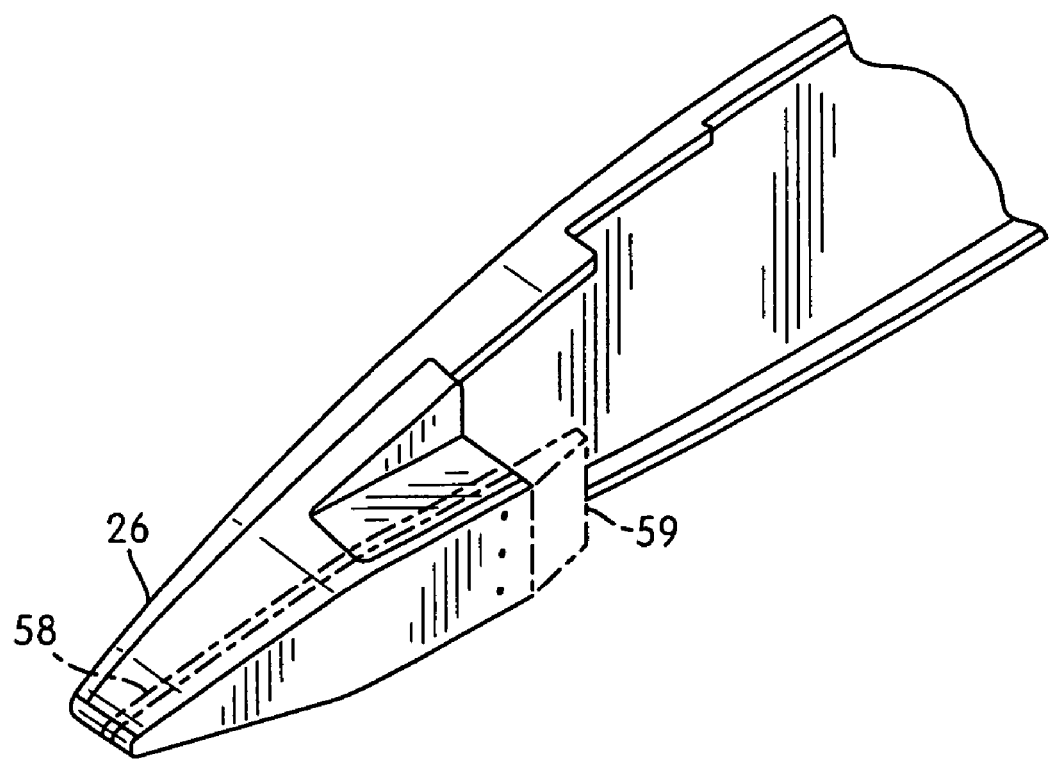
FIG. 13 is a perspective view of one of the STANG fairings as modified to accommodate the mixer of the present invention.

Because mixer 20, such as illustrated in FIGS. 4, 5, et seq., has a 1,065 sq. inch to 1,100 square inch (6,089 to 7,097 square centimeters) area encompassed by the lobes at plane #1 and a 1,223 square inch (7,891 square centimeters) area at plane #5, where the mixer is joined to nozzle assembly 18, it is possible to use the mixer without any modification of thrust reversers 22. As a result, it is necessary only to slightly reconfigure the structure covered by fairings 26. Such reconfiguration is depicted in FIGS. 12 and 13, and is effected by removing only a small portion from each of such structure, specifically that portion indicated by parallel dashed lines 58. Further, a tongue 59 is also removed.

The following points, although not exclusive, may be advanced in summary of the present invention.

A. As an important design parameter, the mixer has as short a length as is possible, e.g., 12 inches±3 inches (30.45 cm±8 cm). The lobe shape starts with a circular or rounded configuration at 39.7 inches (101 centimeters) and terminates with a scalloped or undulated configuration at the same diameter (39.7 inches or 101 centimeters) and an area of 1,065 sq. inches to 1,100 sq. inches (6,089 to 7,097 square centimeters), which matches the existing tailpipe area. By keeping the mixer short, it will not interfere with the existing thrust reverser doors at the end of the tailpipe.

B. The mixer is designed so that it can be attached to the existing tailpipe with minimum impact on exiting components, such as the thrust reverser, thrust reverser doors, stang fairings, outer fairings.

C. The mixer has elliptically shaped lobes whose shapes are proportional to a 10×2.5 ellipse (plus or minus 2 inch major axis, and plus or minus 0.5 inch minor axis). These curved sides help to resist distortion caused by exhaust gas pressure.

D. The transition in the lobes from a round to a scalloped shape forms a very smooth curve in order to minimize airflow distortion and drag and to maximize the mixing of the hot gases with neighboring air. This is achieved by using six synchronized cross-sections and many weighted and blending splines between the cross-sections. The design was achieved using state-of-the-art CAD software, Surfcam, from Surfware, Inc.

E. The cross-sectional area of the mixer, taken along its axis, decreases arithmetically, about 5%, 2.5%, 1.25%, etc., until its terminus is reached.

F. Rather than simply splitting the air flow, the mixer inner lobe surfaces ramps the exhaust gases inward and, at the same time, the outer surface draws outside air into the mixer using a type of NACA duct (airfoil air scoop) so that, when the hot gases and the cooling air is mixed, the exhaust noise is reduced.

G. The contour lines of the lobed surfaces form a uniform initial slope, which is desirable to ensure even pressure as the exhaust gases are redirected inward.

H. Testing of the final lobe shape design with models ensured that the lobes would be formed with relative ease from a flat sheet, and with minimum distortion or strain which would be otherwise caused by material stretching and compressing as the flat sheet is forced into the desired configuration. Such ease of formation is amenable to selection of the preferred material which comprises an aerospace alloy, Inconel 625, a difficult material to work.

I. Twelve lobes are used to match the existing twelve vanes in the engine that swirl and spin the exhaust gases as they leave the engine. The twelve "hot spots" inside the tailpipe, which are produced by the existing vanes, are broken up by the twelve lobes of the present invention, thereby minimizing any undesirable hot spots.

J. The lobe shape forms a complex compound surface, with as large as possible employ of radii used at all locations so as to minimize drag and to allow for the smoothest possible gas flow redirection.

Figure 14:
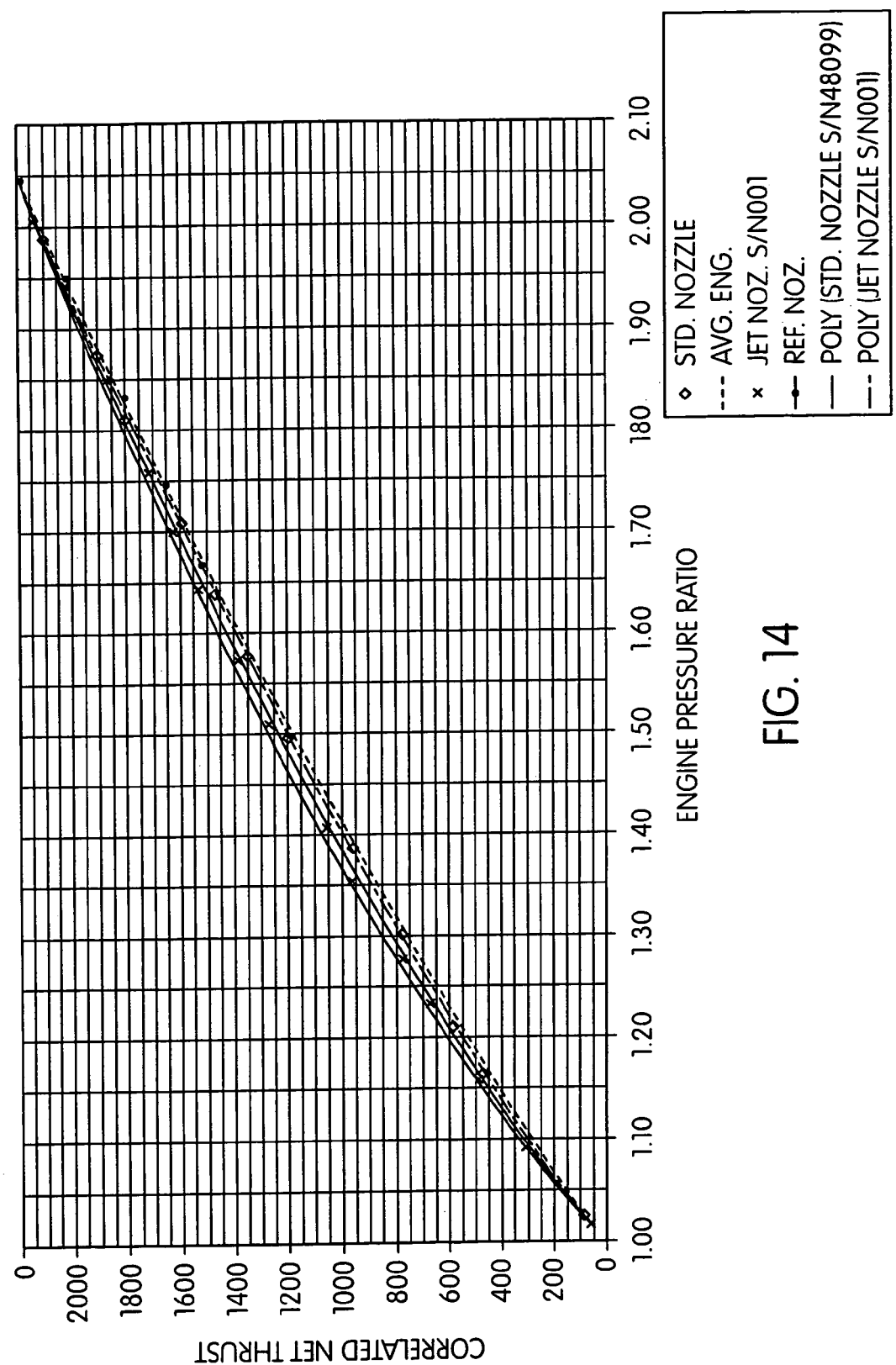
FIG. 14 is a graph attesting to the improvement in net thrust versus engine pressure ratio in a Pratt & Whitney JT8D-217/219 Series engine when use of the second stage external mixer of the present invention is compared to that of a standard nozzle, in which the engine pressure ratio is defined as the measure of engine exhaust pressure divided by ambient pressure.
Figure 15:
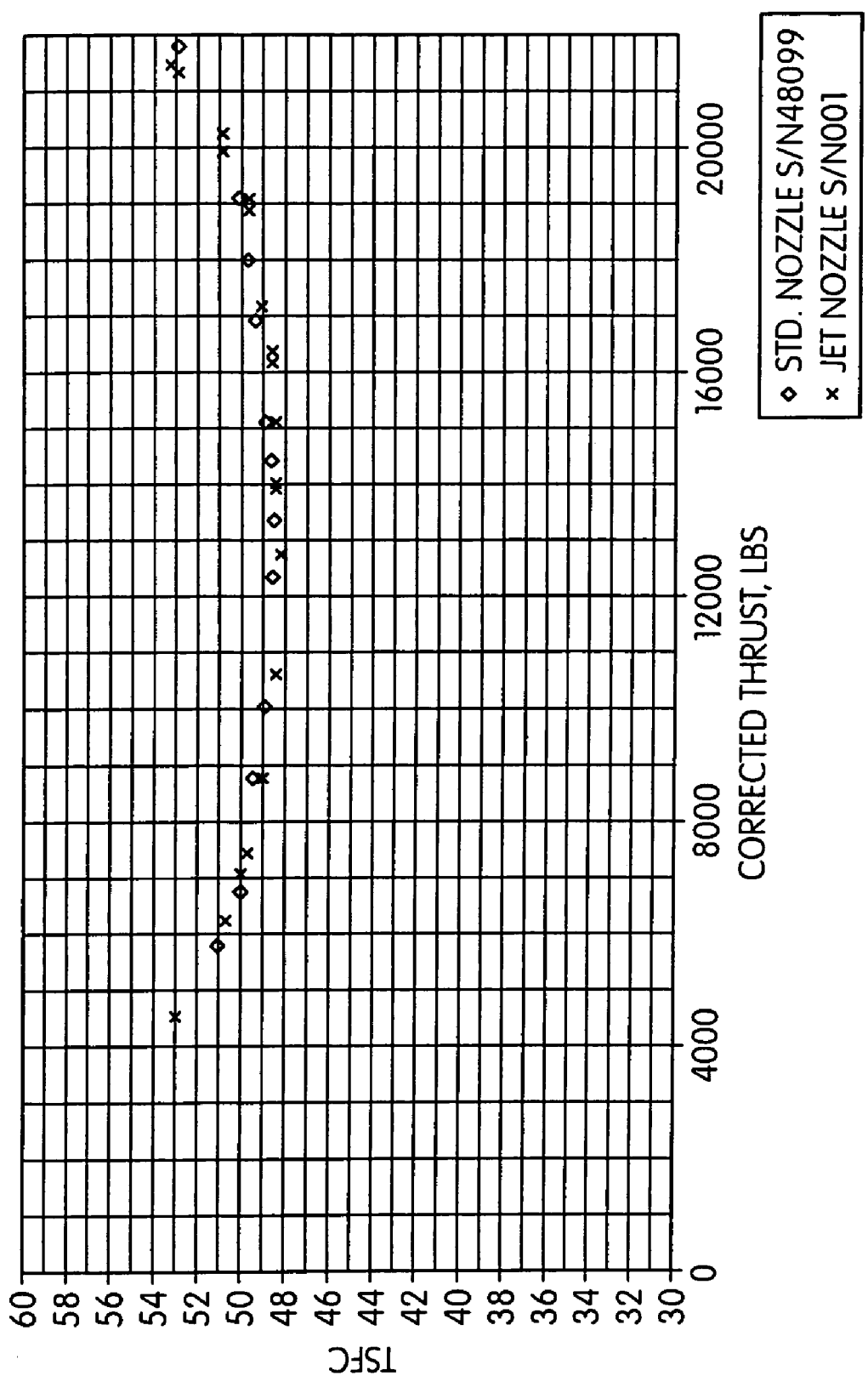
FIG. 15 is a graph demonstrating the improvement in TSFC (thrust specific fuel consumption) versus thrust in a Pratt & Whitney JT8D-217/219 Series engine when use of the second stage external mixer of the present invention is compared to that of a standard nozzle.
Figure 16:
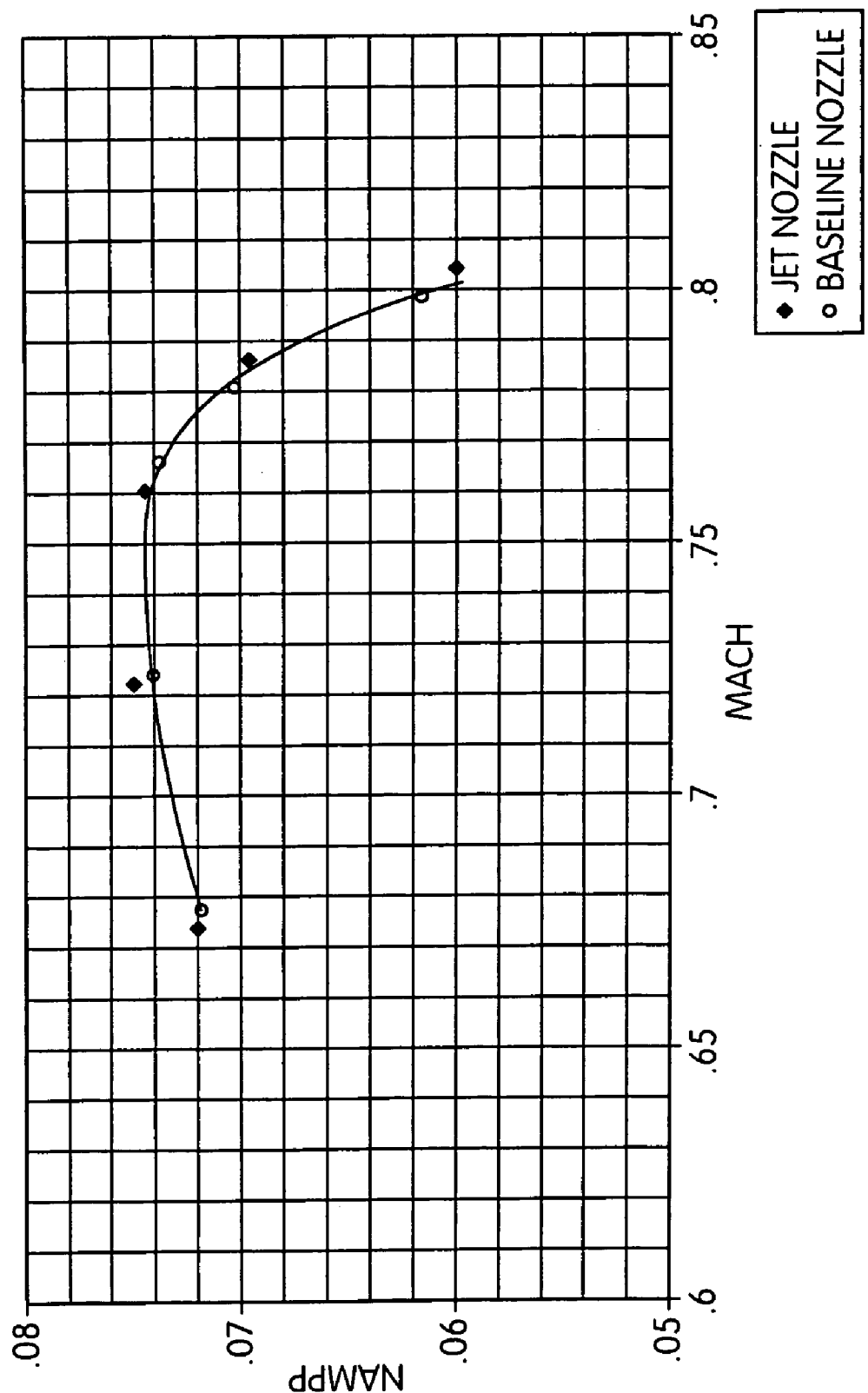
FIG. 16 is a graph of preliminary flight test data of a McDonnell-Douglas MD-80 aircraft as evidence of the improvement in fuel consumption in terms of NAMPP (nautical air miles per pound of fuel) versus mach in a Pratt & Whitney JT8D-217/219 Series engine when use of the second stage external mixer of the present invention is compared to that of a standard nozzle.

Preliminary testing of the present invention, as used in a Pratt & Whitney JT8D-217/219 Series jet engine, has disclosed decided improvements in performance as compared to conventional technology. Such data, as shown in FIGS. 14–16, are based upon present testing. It is therefore to be understood that final test results may evidence different data. Notwithstanding, as shown in these graphical representations of preliminary test data, the external or second stage mixer of the present invention demonstrates improved performance over that obtainable with conventional systems.

FIG. 14 discloses that, based upon a reasonable match for all engine parameters, such as engine revolutions per minute (rpm), exhaust gas temperature (EGT) and fuel pump data, the present invention demonstrates an increase in thrust at the mid range of engine pressure ratio (EPR), that is, engine exhaust pressure divided by ambient pressure. These tests were conducted by use of the external or second stage mixer of the present invention as compared to use of a standard nozzle (Serial Number 48099 as detailed in a United Technologies Corporation (UTC) document for its Pratt & Whitney engines, entitled "JT8D-209, -217, -217A, -217C, -219, TURBOFAN ENGINES ENGINE MANUAL PART NO. 773128", bearing an initial issue date of Jul. 1, 1979 and revised Nov. 15, 2001.

FIG. 15 reveals that the present invention, within a mid thrust range of 7,000 to 15,000 pounds of thrust, improves upon the TFC (specific fuel consumption) by a factor of approximately 2% to 3%. The following example is given to demonstrate the economic benefits obtained by assuming a 2% increase in fuel consumption. An engine average fuel burn of 7,000 pounds of fuel per hour converts into an approximate consumption of 1,000 gallons per hour of fuel. Based upon an assumed yearly flight usage of a McDonnell-Douglas MD-80 aircraft of about 2,000 hours per year, the aircraft consumes about 2,000,000 gallons of fuel per year. At a cost of $1.00 per gallon, the annual fuel cost for such an aircraft would be $2,000,000. Therefore, for a 2% improvement in fuel consumption as provided by the present invention, the saving would amount to $40,000 per aircraft.

FIG. 16 compares the improvement in nautical air miles per pound of fuel (NAMPP) versus mach number for a McDonnell-Douglas MD-80 aircraft through use vis-a-vis non-use of the present invention. Here, preliminary flight data shows an increased NAMPP of the "JET nozzle" over all points on the curve when employing the present invention over its non-use "baseline nozzle."

Figure 17:
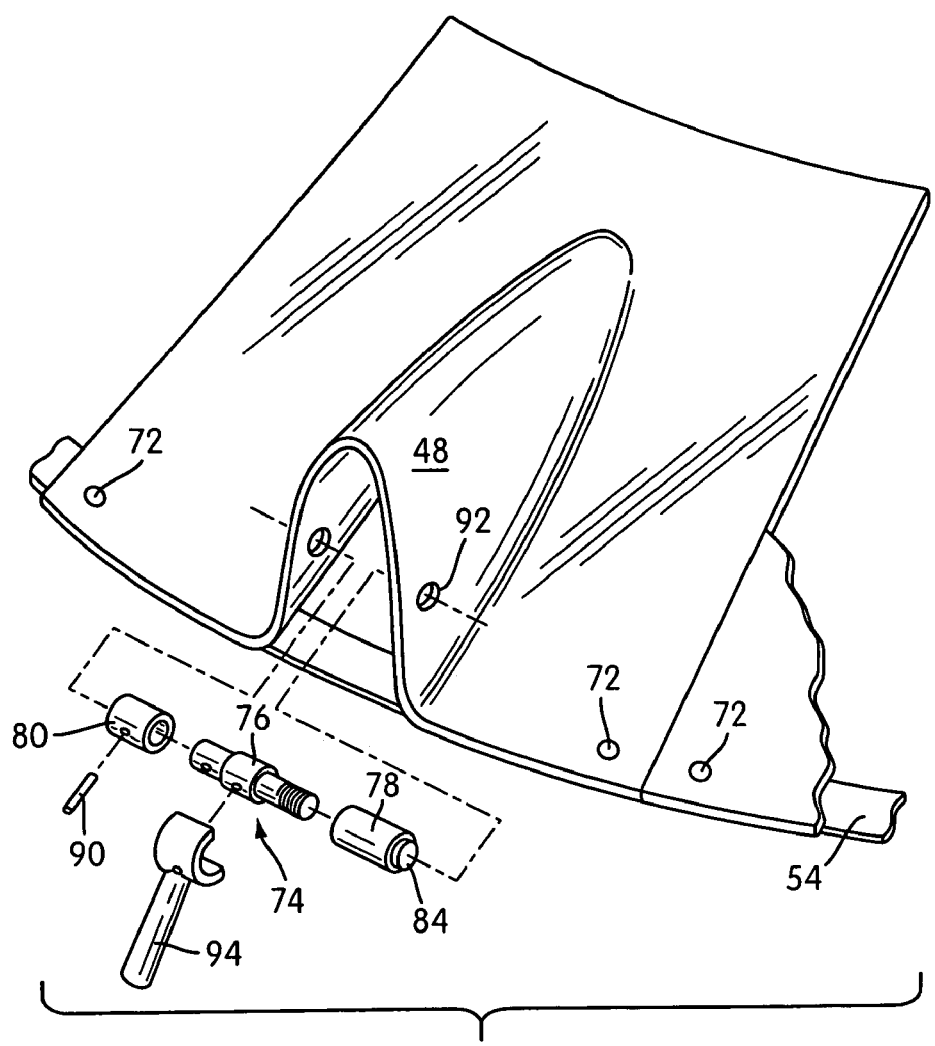
FIG. 17 depicts a perspective view an additional preferred embodiment wherein the lobes assembled to form the external mixer assembly depicted in FIG. 4 include an adjustable rod spacer assembly adapted for engagement with the sidewalls forming each of the lobes to adjust the distance between the sidewalls and the resulting area of the formed chutes.

FIG. 17 depicts a perspective view an additional preferred embodiment of the disclosed device wherein the plurality of lobes 48 are assembled to form the jet nozzle mixer 20 with the band 54 engaged around the assembled lobes 48 at the terminus area of the second stage external jet nozzle mixer 20 to maintain heir shape and the total area of the terminus area defined by the undulating surface of the assembled lobes 48. This band 54 is attached around the external surface to maintain the size of the terminus when exhaust gasses are forced therethrough which exert and expanding force on the terminus area of the assembled lobes 48.

Since the intricate bends of the metal forming each lobe 48, determine the ultimate total area of the second stage mixer terminus, when the plurality of lobes 48 are assembled into a second stage external jet nozzle mixer 20, it is extremely important that the forming of the lobes 48 yield proper contiguous shape around the terminus area to yield the a total second stage mixer terminus to match that of the first stage, as noted above. This match is especially important in that the engine speed of the jet engine is directly impacted by the total area of the terminus area defined by the band encircled lobes 48. Every jet engine in use commercially has an FAA and manufacturer determined engine RPM that must be maintained during operation of the engine. A second stage external jet nozzle mixer 20, which when attached, causes the jet engine to run at this approved RPM is said to achieve a match. A very slight change in the total area of the terminus area of the second stage external jet nozzle mixer 20, when engaged on the engine, can severely impact the engine RPM causing it to exceed or run under the manufacture and FAA required engine RPM speed. Consequently, it is exceedingly beneficial to form the second stage external jet nozzle 20 from a plurality of properly shaped lobes 48 which when banded at a determined torque or pressure exertion by the band 54, will yield a total area of the terminus area to achieve a match to the FAA and manufacturer requirements. However, just like different car engines may need carburetor adjustments to match the airflow to the idiosyncrasies of the engine, or the manufacturing tolerances of the carburetor, different second stage external jet nozzle mixers 20 may need adjustments in lobe size, shape, and radius to achieve this match and proper engine RPM when attached to the first stage or internal jet nozzle mixer 42 of the engine to which it is engaged. Further, manufacturing tolerances and slight differences in the size, shape, or radius of the individual lobes 48, when assembled into a second stage external jet nozzle mixer 20, and engaged at the proper torque specifications by the band 54, can add up to cause the formed second stage external jet nozzle mixer 20 which has an exit terminus area adjacent to the band 54 which is of improper size. This can cause the engine speed to exceed or underperform the narrow range of FAA and manufacturer specified RPM. Further, because the chutes 66 formed by the lobes 48 direct ambient air into the exhaust flow at the terminus area and thereby help attenuate noise, correct dimensioning of the lobe 48 to yield a properly shaped exterior surface forming the chute 66 is also important.

Conventionally, when such a mismatch occurs between the area of the terminus area causing improper engine RPM and/or noise outside of the specified range, the entire second stage external jet nozzle mixer 20 would have to be reengineered. In that process many man hours of engineering and manufacture are required at great expense. Further, tooling must be manufactured to form the lobes 48 at slightly different dimensional characteristics to hopefully yield the proper total terminus area when assembled and compressed by the band 54. Because of the many variables involved in calculating the terminus area on the assembled and banded second stage external jet nozzle mixers 20, it is exceedingly difficult to determine if the outcome of the reengineered device will yield the proper terminus area to yield the match in engine RPM to FAA and manufacturer specifications when it is finally attached. This trial and error manner of engineering and construction is done at great cost in time and money.

Consequently, this preferred embodiment of the disclosed device is especially useful as it provides a means to adjust the dimensional characteristics of the lobes 48 by changing the external contours of the lobes 48 which also act as chutes 66 of the assembled second stage external jet nozzle mixer 20, Employing this embodiment, not only may the total area of the terminus area be adjusted easily to achieve the desired engine speed match, it also allows provides a means of adjustment of the dimensional characteristics of the chutes which in turn provides a means to adjust noise attenuation. The provision of such adjustability allows each second stage external jet nozzle mixer 20 to be tuned to both correct any manufacturing anomalies that might have occurred in lobe dimensions as well as to match the individual second stage external jet nozzle mixer 20 to the engine and first stage mixer to which it is engaged to achieve an RPM match to the FAA and manufacturer specifications. No longer need the entire second stage external jet nozzle mixer 20 be reengineered and re manufactured at great cost in time and money if a mismatch occurs on the first installation and testing of the device.

Such means for adjustment of the total area of the terminus area is provided in this preferred embodiment through the inclusion a means for dimensional adjustment of the lobes 48 in the form of a means translate said two sides of each lobe 48 away from the lobe center axis. A very slight change in the dimension of the lobes 48, and thereafter engaging the band 54 thereover at the proper compression specification, thereby alters the total area of the terminus area. Because the total terminus area may be changed easily, achieving the FAA and manufacturer required match for proper engine RPM is achieved without any need for re engineering and re manufacturing.

Further, older second stage external jet nozzle mixers 20 which either lack this means for adjustment of the total area of the terminus area may be retrofitted with the means for dimensional adjustment of the lobes 48 and thereby provide the means to adjust the total terminus area. Or, second stage external jet nozzle mixers 20 which do have this means for terminus area adjustment but have fallen out of the specified range to achieve a match to proper RPM may be easily reset the proper terminus area to achieve the specified engine match by simply removing the band 54, changing the lobe dimensions, and recompressing the band 54.

The means to adjust the dimensional characteristics of the lobes 48 to thereby adjust the total area of the terminus area, in the current preferred embodiment is provided by a rod spacer assembly 74 engaged across each chute 66. Concurrently, adjusting this means to adjust lobe dimension to adjust the area of the terminus, also adjusts the size and consequently the area of each exit aperture of each chute 66 positioned at adjacent to the terminus of the second stage external jet nozzle mixer 20. Since adjustments to this chute exit aperture dimension will affect the amount, direction, and speed of ambient airflow therethrough, and the chutes 66 help attenuate noise from the engine, such adjustments also provide a means to adjust noise attenuation from the engine to which the second stage external jet nozzle mixer 20 is attached. In use therefor, the device may be used for either or both adjusting the terminus area to achieve proper engine speed match, or noise attenuation of the engine.

Figure 19:
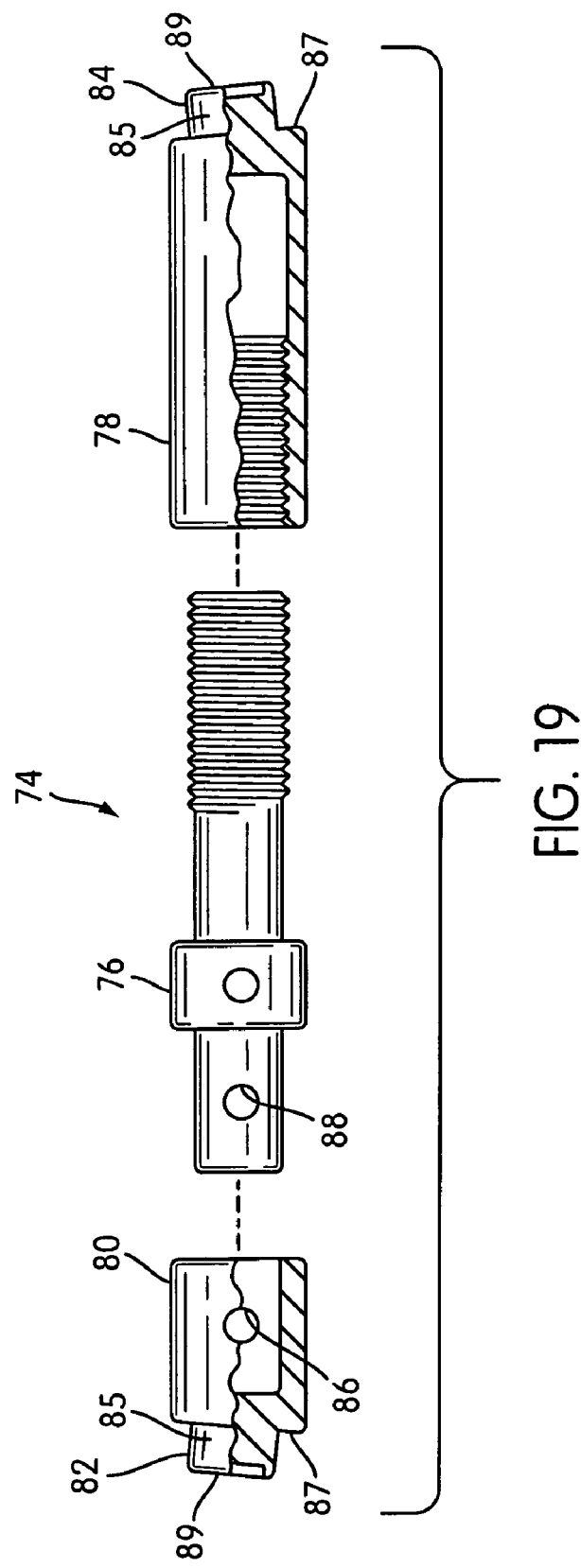
FIG. 19 is an exploded view of the rod spacer assembly which is having distal ends adapted to engage with apertures formed in the sidewalls defining the chute of the lobes assembled to yield the external mixer assembly.

The means to adjust dimensional characteristics of the lobe is depicted rod spacer assembly 74 which is adapted at a first end 82 and second end 84 to engage with the two opposing walls forming the lobe 48. A current preferred means of engagement of the two ends of the rod spacer assembly 74 with the two opposing walls forming the lobe 48 features shoulders 85 formed on both ends of the rod spacer assembly 74 sized to cooperatively engage with lobe apertures 92 communicating into the walls forming each lobe 48. As best shown in FIG. 19, sloping the center axis of the shoulders 85 in relation to the center axis of the assembled rod spacer assembly 74 yields an angled base 87 which smoothly engages the angled surface of the chute 66 and angled end walls 89 which fill the area of the lobe apertures 92 and thereby provide a substantially smooth lobe surface on the channel side of the lobes 48.

Figure 18:
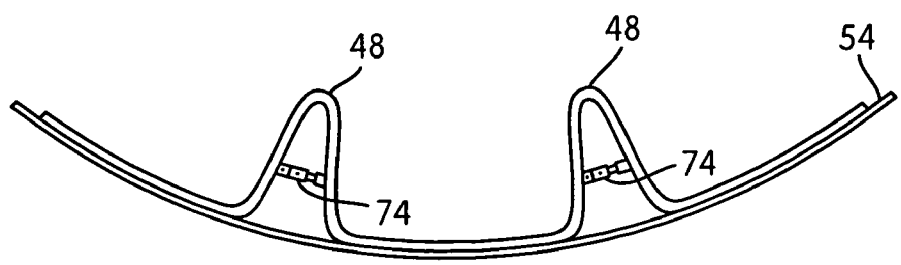
FIG. 18 depicts an end view showing a plurality of engaged lobes used to form the external mixer assembly and showing a rod spacer assembly engaged with the sidewalls forming the lobe. The rod spacer assembly may be adjusted to laterality translate its distal ends toward or away from each other thereby providing means for adjustment of the area of the formed chute.

Each rod spacer assembly 74 when engaged in the individual lobes 48, as can be seen in FIG. 18, in providing a means to adjust dimensional characteristics of the lobe 48 provides the means to adjust the total terminus area of the second stage external jet nozzle mixer 20 to achieve the desired match to the engine. As can be seen in FIG. 19, the first end 82 of the rod spacer assembly 74 is laterally translatable toward and away from the second end 84 by rotating the stud 76 in its threaded engagement with the barrel nut 78. When the stud 76 is rotated by a tool 94 adapted to engage the stud 74, it rotates freely on one end rotationally engaged in a barrel sleeve 80 and in a threaded engagement at the opposite end with the barrel nut 78. This rotation as can be discerned from FIG. 18 will cause the first end 82 to move either toward or away from the second end 84. When engaged in the lobe apertures 92 of the lobe 48, moving the first end 82 away from the second end 84 will in turn force the walls forming the lobe 48 outward slightly thereby increasing the total terminus area of the chute 66 while concurrently slightly decreasing the total of the second stage mixer terminus area formed by the total exterior surface area of the undulating lobes 48 in the assembled second stage external jet nozzle mixer 20. Since the lobe 48 is preformed, expanding the rod spacer assembly 74 compressibly engages it within the chute 66 of the lobe 48 holding it in place while concurrently adjusting the dimensional characteristics of the lobe 48.

Once rod spacer assembly 74 is so compressibly engaged to move the two walls away from the lobe center axis, rotation of the stud 76 in the opposite direction will cause the first end 82 to move toward the second end 84 and thereby cause corresponding decrease in the terminus area of the chute 66 while concurrently increasing the total terminus area of the second stage mixer 20. Once adjusted correctly, a locking pin 90 is engaged and the band 54 is engaged around the second stage external jet nozzle mixer 20 immediately adjacent to the terminus area to the proper tension. Currently that tension can be in a range between 150 and 350 pounds. Once the band 54 is so engaged, the total area of the terminus area is fixed. To achieve the perfect match for engine RPM the rod spacer assembly 74 provides a means to fine tune the area of each individual chute 66 and to fine tune the total area of the terminus area of the second stage external jet nozzle mixer 20. Each individual engine may be matched to each individual second stage external jet nozzle mixer 20 with great precision and with ease.

Since each chute 66 acts as a venturi accelerate the cooler secondary flow of ambient air into the previously mixed primary flow as it exits the nozzle, which in turn further reduces the noise levels, the ability to fine tune each chute 66 provides a means to adjust or attenuate the noise level exiting the jet engine. Further, since the rod spacer assembly 74 also provides a means to adjust the total terminus area of the second stage external jet nozzle mixer 20, this terminus area can be easily adjusted and matched to each individual engine on which it is mated. This give the user the ability to adjust this terminus area with great precision to a total area is consistent with that of the engine in question while concurrently making adjustments to each individual chute 66 to reduce noise levels if desirable. The inclusion of such rod spacer assemblies 74 thus yields heretofore unmatched precision in mating each second stage jet nozzle mixer 20 to the idiosyncrasies of each individual engine on which it is respectively mounted providing the user with the ability to adjust for noise, and for engine exhaust area to terminus exhaust area to yield better performance from each jet engine on which it is mounted.

As can be seen, the rod spacer assembly 74 might also be used as a retrofit to second stage external jet nozzle mixers which do not have such a device to provide for adjustment of the terminus area of the chutes 66 and the total terminus area defined by the exterior surface of the lobes 48. Once such a lacking second stage external jet nozzle mixer is removed and its band removed it would be ready for retrofit. A method of accomplishing this task would be to form a means to engage the two ends of a rod spacer assembly 74 in the chutes 66 of a second stage jet external jet nozzle mixer lacking a means to adjust lobe dimension to adjust the total terminus area. This currently would entail the placement of lobe apertures 92 in each lobe positioned to cooperatively engage the two ends of each rod spacer assembly, however other means to engage the ends could be used and are anticipated for all embodiments of this device. Next, an assembled but collapsed rod spacer assembly 74 would be placed in the appropriate chute 66 and expanded such that the two ends of the rod spacer assembly 74 engage with the two walls of the lobe 48. Finally, the distance between the two ends of the rod spacer assembly 74 would be translated to a position away from each other to change each of the lobe dimensions and expand the chute 66 areas and thereby tune the total terminus area of the second stage external jet nozzle mixer 20 to match the terminus area of the engine on which it is attached to yield the best engine performance and lowest noise level. The band would be reattached and tensioned to the proper force and the device reattached to the jet engine. This could be done to achieve the proper performance characteristics and noise attenuation on any jet engine currently using a second stage jet nozzle mixer 20 to reform the terminus to achieve the engine match.

It is to be understood that, in the foregoing exposition where dimensions, areas, etc., are expressed in English system units and, parenthetically, in metric system units, the English unit system shall take precedence in the event of any error in conversion from the English unit system to the metric unit system.

Although the invention has been described with respect to a particular embodiment thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention, and such changes, alternations and modifications as would occur to those skilled in the art are considered to be within the scope of this invention as broadly defined in the appended claims.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. In a nozzle for a jet engine having an existing first stage mixer which includes a number of first stage lobes, the improvement comprising
    a second stage mixer adapted for engagement to the first stage mixer, said second stage mixer having
    a base section having a first end constructed and arranged for attachment to a jet engine; and
    mixer lobes extending from said base section, said mixer lobes increasing in height as said mixer lobes extend away from said first end of said base section to an undulating configuration defining a terminus area of said mixer; and
    an adjustment device attached to a lobe to adjust the individual dimensions of said lobe and thereby adjust the total area of said terminus area, said adjustment device including a first spacer element constructed and arranged to selectively move between a first locked position wherein said lobe has a first dimension and a second locked position wherein said lobe has a second dimension,
    each of said mixer lobes having a substantially curved shape defined by two communicating sides curving around a center axis, and
    said adjustment device being fixedly connected to each of said two sides of said corresponding mixer lobe to move said two sides relative to said center axis, said adjustment device extending directly between said two sides, and the entirety of said adjustment device extending directly between said two sides being positioned in-between said two sides of said mixing lobe and being supported in position in-between said two sides only by the connection of said adjustment device with said two sides and being otherwise free standing.

2. A mixer for a jet engine, the mixer comprising:
    a base section having a first end constructed and arranged for attachment to a jet engine;
    mixer lobes extending from said base section, said mixer lobes increasing in height as said mixer lobes extend away from said first end of said base section to an undulating configuration defining a terminus area of said mixer; and
    an adjustment device attached to a lobe to adjust the individual dimensions of said lobe and thereby adjust the total area of said terminus area, said adjustment device including a first spacer element constructed and arranged to selectively move between a first locked position wherein said lobe has a first dimension and a second locked position wherein said lobe has a second dimensions,
    each of said mixer lobes having a substantially curved shape defined by two communicating sides curving around a center axis, and
    said adjustment device being fixedly connected to each of said two sides of said corresponding mixer lobe to move said two sides relative to said center axis, said adjustment device extending directly between said two sides, and the entirety of said adjustment device extending directly between said two sides being positioned in-between said two sides of said mixing lobe and being supported in position in-between said two sides only by the connection of said adjustment device with said two sides and being otherwise free standing.

3. A mixer according to claim 2, wherein
said base section is substantially circular, and said mixer lobes are spaced around said base section.

4. A mixer according to claim 2, wherein
each of said lobes includes a corresponding one of said adjustment devices.

5. A mixer according to claim 4, wherein
each of said mixer lobes has a substantially curved shape defined by two communicating sides curving around a center axis, and said corresponding adjustment device is fixedly connected to each of said sides of said corresponding mixer lobe to move said two sides relative to said center axis.

6. A mixer for a jet engine, the mixer comprising:
a base section having a first end constructed and arranged for attachment to a jet engine;
mixer lobes extending from said base section, said mixer lobes increasing in height as said mixer lobes extend away from said first end of said base section to an undulating configuration defining a terminus area of said mixer; and
an adjustment device attached to a lobe to adjust the individual dimensions of said lobe and thereby adjust the total area of said terminus area, said adjustment device including a first spacer element constructed and arranged to selectively move between a first locked position wherein said lobe has a first dimension and a second locked position wherein said lobe has a second dimension, wherein
said adjusting device includes a rod spacer assembly having a first end engaged with a second end,
each of said mixer lobes defined by a first wall intersecting a second wall,
said first end adapted for cooperative engagement with said first wall and said second end adapted for cooperative engagement with said second end, and said first and second ends structured and arranged so that said first end of said rod spacer may laterally translate toward or away from said second end.

7. A method of employing an adjustment device to adjust the total terminus area of a mixer adapted for engagement at a first end to a jet engine, comprising:
attaching a first adjustment device to a first jet engine mixer lobe, the lobe having a substantially curved shape defined by two communicating sides curving around a center axis, and the first adjustment device being fixedly connected to each of the two sides of said corresponding mixer lobe to move the two sides relative to the center axis, the first adjustment device extending directly between the two sides, and the entirety of the first adjustment device extending directly between the two sides being positioned in-between the two sides of the mixing lobe and being supported in position in-between the two sides only by the connection of the first adjustment device with the two sides and being otherwise free standing;
selectively moving the first adjustment device to alter the dimensional characteristics of the first jet engine mixer lobe by adjusting a portion of the first adjustment device that is positioned in-between the two sides.

8. A method according to claim 7, further comprising:
attaching a second adjustment device to a second jet engine mixer lobe; and
selectively moving the second adjustment device to alter the dimensional characteristics of the second jet engine mixer lobe.

9. A method according to claim 8, further comprising:
tensioning a band around the mixer adjacent to the terminus area after all of the mixer lobes have had their respective dimensional characteristics adjusted.

\* \* \* \* \*